Dec. 20, 1955   J. L. VODONIK   2,727,882
PROCESS AND APPARATUS FOR THE CONTINUOUS POLYMERIZATION
OF BIS-2-HYDROXY-ETHYL TEREPHTHALATE
Filed Oct. 14, 1952   3 Sheets-Sheet 1

INVENTOR
Joseph L. Vodonik
BY
ATTORNEY

Dec. 20, 1955    J. L. VODONIK    2,727,882
PROCESS AND APPARATUS FOR THE CONTINUOUS POLYMERIZATION
OF BIS-2-HYDROXY-ETHYL TEREPHTHALATE
Filed Oct. 14, 1952    3 Sheets-Sheet 2

INVENTOR
Joseph L. Vodonik
BY *A. Ralph Snyder*
ATTORNEY

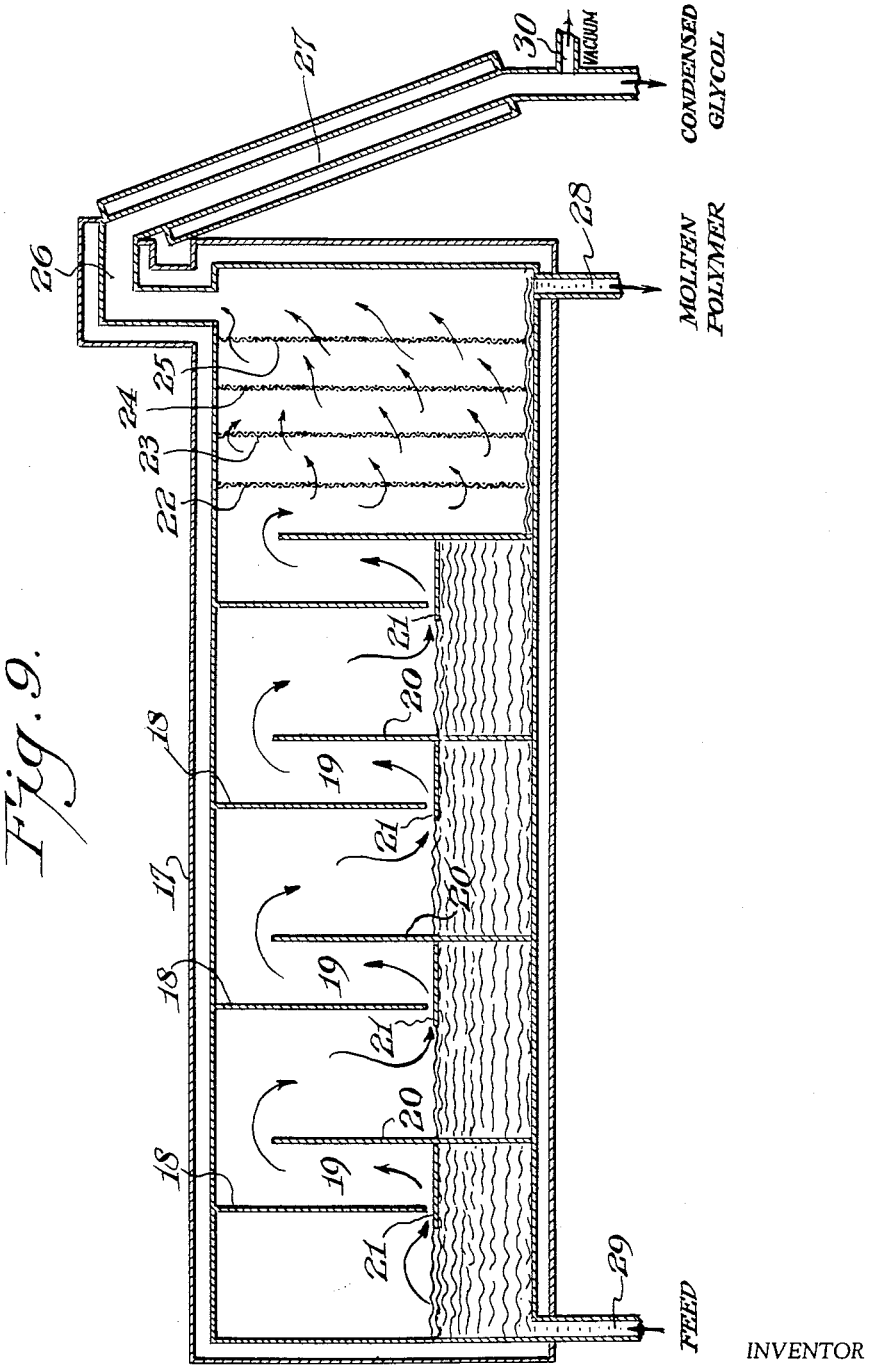

United States Patent Office 2,727,882
Patented Dec. 20, 1955

2,727,882

PROCESS AND APPARATUS FOR THE CONTINUOUS POLYMERIZATION OF BIS-2-HYDROXY-ETHYL TEREPHTHALATE

Joseph L. Vodonik, Kenmore, N. Y., assignor to E. I. du Pont de Nemours and Company, Wilmington, Del., a corporation of Delaware Application October 14, 1952, Serial No. 314,695

9 Claims. (Cl. 260—75)

This invention relates to a process and apparatus for polymerizing bis-2-hydroxy-ethyl terephthalate and, more particularly, to a continuous process and apparatus for preparing low molecular weight polyethylene terephthalate.

The production of the novel class of film- and fiber-forming linear polyesters of terephthalic acid and a glycol of the series $HO(CH_2)_nOH$ where $n$ is an integer from 2 to 10 inclusive, is fully disclosed in U. S. Patent 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxy-ethyl terephthalate monomer which is polymerized to polyethylene terephthalate under reduced pressure and at elevated temperatures.

Heretofore, polymerization of bis-2-hydroxy-ethyl terephthalate has been carried out batch-wise in large reaction vessels or autoclaves wherein provision is made to agitate the polymerizing mass and remove vaporized ethylene glycol. In carrying out this polymerization on either a batch or continuous scale, it is essential to control the pressure and temperature relationships in the initial stages to prevent undue loss of the low molecular weight polymeric material through vaporization. Furthermore, it is necessary to prevent undue vaporization of the monomeric material which condenses and solidifies in the condenser lines and plugs the lines. In batch processes, the rate of reaction and inhibition of excessive vaporization of monomer or low molecular weight polymer are controlled by initiating the reaction at lower temperatures and higher pressures than are required in the final stages of polymerization. After allowing initial polymerization to proceed at such pressures and temperatures, the temperature of the reaction is gradually raised along with gradually lowering the pressure within the reaction vessel; and the final stage of polymerization is completed at a temperature within the range 275–290° C. and at reduced pressure in the vicinity of 0.5 to 5.0 mm. of mercury.

It is an object of the present invention to provide an apparatus and process for continuously polymerizing bis-2-hydroxy-ethyl terephthalate or a very low molecular weight polymer thereof having a degree of polymerization of less than 4 on the average. It is a further object to provide a continuous process and apparatus for polymerizing bis-2-hydroxy-ethyl terephthalate or a very low molecular weight polymer thereof wherein the pressure is gradually reduced as the polymerizing mass passes through the apparatus. It is a further object to provide a continuous process and apparatus wherein the agitation of the polymerizing mass is provided by gaseous components evolved during polymerization. It is a still further object of the present invention to provide a continuous process and apparatus wherein high surface area generation is accomplished. It is a still further object to provide a process and apparatus wherein stage-wise hold-up of the polymerizing mass is accomplished. Other objects will be obvious from the description of the invention which follows.

These objects are accomplished according to the present invention by continuously introducing a liquid composition comprising essentially bis-2-hydroxy-ethyl terephthalate and a very low molecular weight polymer thereof having a degree of polymerization less than 4 on the average into the bottom of a vessel comprising pressure-reducing stages to be more fully described hereinafter, and continuously withdrawing ethylene glycol and polymerized polyethylene terephthalate from the top of the vessel.

It is to be understood that the present apparatus and process essentially provides for the preparation of what is known as "prepolymer." The term "prepolymer" will be used hereinafter to designate low molecular weight polymers of bis-2-hydroxy-ethyl terephthalate. Generally, the present apparatus and process is employed to prepare prepolymer having an intrinsic viscosity no greater than about 0.3, although higher intrinsic viscosities may be obtained. The ultimate viscosity obtainable in any particular embodiment of this invention is limited by that which permits efficient handling of the polymerizing mass. In other words, the viscosity of the liquid polymerizing mass must be low enough to permit free flow and agitation in the manner hereinafter set forth. Generally, the present apparatus and process does not efficiently handle viscous liquids having a viscosity substantially greater than 100 poises. In the case of handling prepolymer of bis-2-hydroxy-ethyl terephthalate, the ultimate intrinsic viscosity of material which can be efficiently handled is about 0.3–0.4.

As used herein, intrinsic viscosity, denoted by the symbol $(n)_0$, is a measure of the degree of polymerization of the polyester and may be defined as:

$$\text{limit } \frac{\ln (n_r)}{C} \text{ as C approaches } 0$$

wherein $n_r$ is the viscosity of a dilute phenol-tetrachloroethane (60–40) solution of the polyester divided by the viscosity of the phenol-tetrachloroethane mixture per se measured in the same units at the same temperature, and the C is the concentration in grams of polyester per 100 cc. of solution.

It should be understood that the term "prepolymer" should not be confused with the very low molecular weight polymer which may be treated in accordance with the present process. Very low molecular weight polymer in the feed has a "degree of polymerization" (DP) of less than 4 on the average, which means that the average chain length or number of monomer units connected together is less than 4 on the average. The degree of polymerization of the prepolymer prepared in accordance with the present invention is appreciably higher, roughly up to 65 times higher.

The liquid material fed to the apparatus and treated in accordance with the process of the present invention essentially comprises bis-2-hydroxy-ethyl terephthalate and/or, as stated above, a low molecular weight polymer thereof having a degree of polymerization less than 4, on the average. The contents of the liquid feed may also include small quantities of ethylene glycol; an alkyl ester of terephthalic acid, e. g., dimethyl terephthalate; and quantities of a half ester of glycol and terephthalic acid. Dissolving quantities of "scrap" polyethylene terephthalate in the liquid feed may be highly desirable in a coordinated continuous operation; e. g., trim from extruded film may be utilized by dissolving this material into the feed to the present apparatus. However, since the outstanding advantage of the present invention is the provision of a continuous process for polymerization of an ester monomer and/or a very low molecular weight polymer, this apparatus is primarily intended to be connected to a continuous source of the monomer and/or very low molecular weight polymer.

The invention will now be described with reference to the accompanying drawings wherein.

Figure 6:
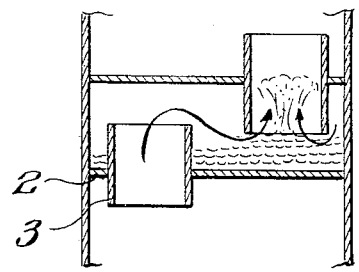
Figure 7:
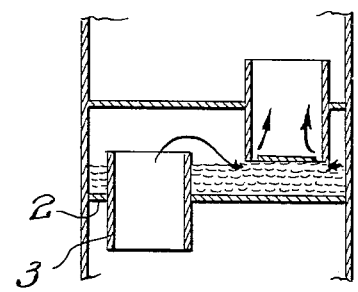
Figure 8:
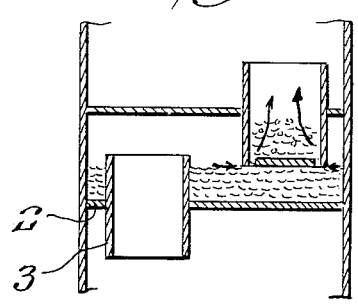

Figures 6, 7, and 8 are diagrammatic illustrations showing the action of the polymer and gases with reference to upcomer tubes having unimpeded bottom openings and upcomer tubes provided with restricted bottom orifices; and Figure 9 is a front elevation, with parts broken away, showing an alternative construction of the apparatus of this invention.

Figure 1:
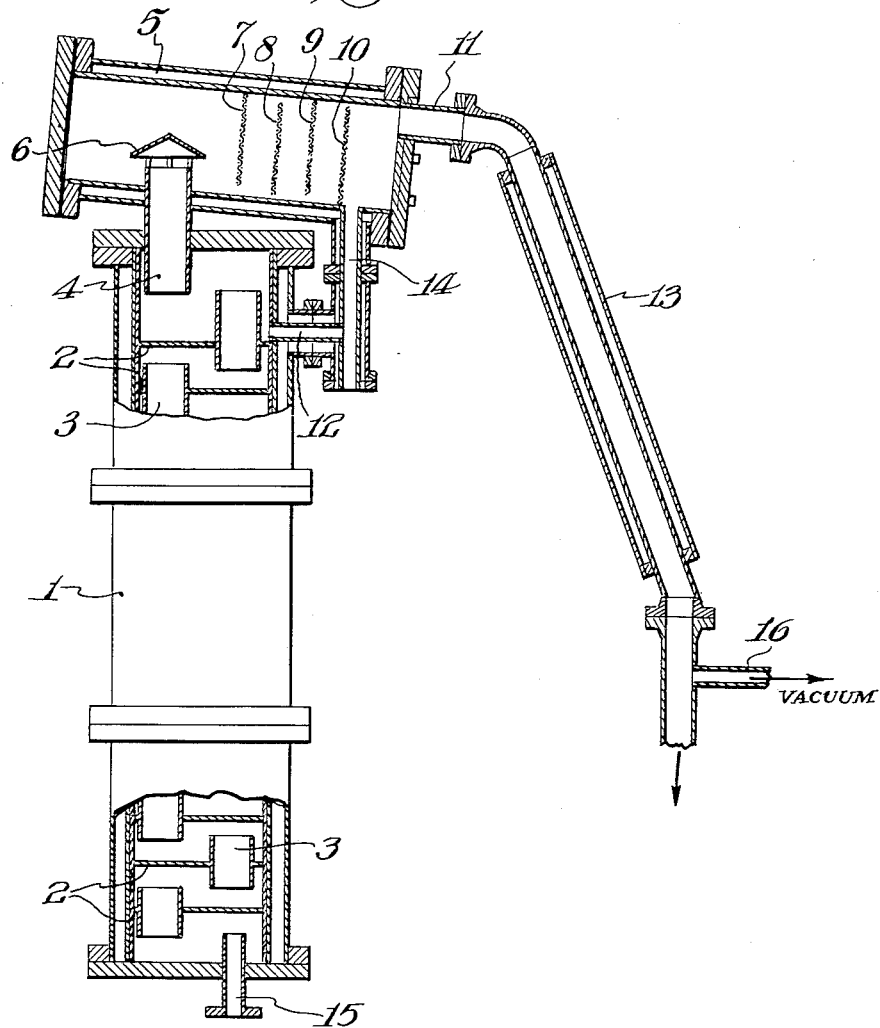
Figure 1 is a front elevation, with parts broken away to show the interior construction of a preferred embodiment of the apparatus of this invention.
Figure 2:
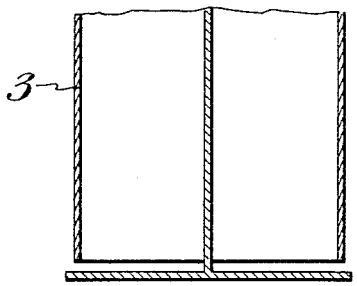
Figures 2, 3 and 4 are sectional views illustrating three modifications of special restricted orifices which may be provided at the bottom of the upcomer tubes to control pressure drop.
Figure 3:
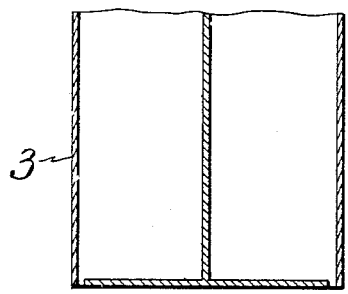
Figure 4:
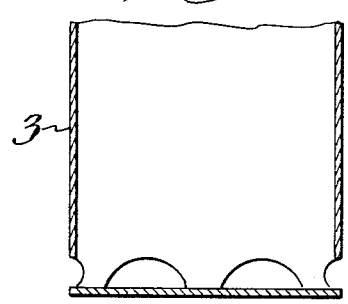

Referring particularly to Figure 1, a preferred embodiment of an apparatus within the scope of the invention comprises a jacketed column 1 divided into a plurality of vertically disposed sections or chambers by plates 2, defining successive reaction zones. Communication between these sections is provided by a series of upcomer tubes 3, fitted in plates 2, the tube providing the inlet for a given section being offset with respect to the tube providing the outlet therefor. Each tube extends above and below the plate into which it is fitted with the top of one tube extending above the bottom of the adjacent offset tube. For reasons pointed out hereinafter, each upcomer tube may be provided with restricted bottom openings, as shown in Figures 2, 3, and 4. The uppermost section in the column communicates at its top, through upcomer tube 4, with a jacketed entrainment separator 5 which is inclined slightly from the horizontal, and is provided with splash plate 6 at the head of the upcomer 4, and screens 7, 8, 9, and 10, through which the vapor passes to vapor outlet 11, and thereafter into condenser 13. Liquid polymer is withdrawn from the uppermost plate through 12, and any polymer entrained into the separator 5 is permitted to drain through 14 and into the main take-off line for further processing. An inlet 15 in the lowermost section of the column provides for the introduction of monomer into the column. A vacuum line 16 operates to reduce the pressure in the entire system to any desired level.

Referring particularly to Figure 9, an alternative embodiment of the present invention comprises a jacketed cylindrical vessel 17 divided into a plurality of horizontally disposed sections or chambers by baffles 18, defining successive reaction zones. Communication between these sections is provided by a series of upcomer chambers 19 formed by baffles 20 in combination with plates 21. For reasons pointed out hereinafter, the entrance to an upcomer chamber may be restricted to the desired opening by varying the clearance between baffles 18 and plates 21. The outlet end of the vessel consists of any efficient type of vapor-liquid separator, such as a cyclone separator. In this specific apparatus, the separator comprises screens 22, 23, 24, and 25 through which the vapor passes to the vapor outlet 26, from which point the vapor is conducted to a condenser 27 for recovery. Liquid separated from vapor in the separator is drawn off through an outlet conduit 28 for storage, or for immediate further processing. An inlet 29 at the inlet end of the vessel provides for introduction of monomer into the vessel. A vacuum line 30 operates to reduce the pressure in the entire system to the desired level.

The relative size of the present apparatus, i. e., cross-sectional area of the column or vessel and upcomers, height or length, number of pressure-reducing stages or plates, etc., is dependent upon the quantity of materials fed to the column or vessel, upon the final intrinsic viscosity of polymer desired for maximum rate of feed, and upon the hold-up time required. Generally, the cross-sectional area of the column itself should be sufficient to provide room for at least two upcomers arranged in stepwise fashion as shown in the accompanying drawings. An alternative means of increasing the cross-sectional area of an upcomer is to employ a multiplicity of upcomers of smaller cross-sectional area per plate or stage. On the other hand, the diameter of a horizontally disposed cylindrical vessel of the type illustrated in Figure 9 should be adequate to provide an upcomer chamber of sufficient height to provide sufficient mixing of upflowing gases and liquids. Generally, for any given problem of continuously polymerizing an ester monomer of the type described herein, the quantity of material to be handled per unit time and the desired intrinsic viscosity of the polymeric product serve as the basis for estimating the total pressure drop required. With this at hand, the total pressure drop may be obtained in the apparatus of the present invention in increments by varying the number of pressure-reducing stages or plates or by varying the pressure drop effected at each stage or plate. The pressure at the entrance end of the apparatus should be determined by the properties of the monomer. It should be low enough to give driving force to the reaction but not so low as to cause vaporization of the monomer.

Figure 5:
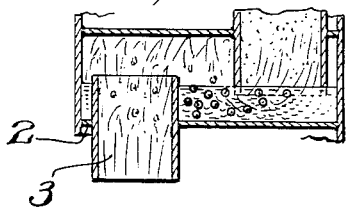
Figure 5 is a diagrammatic illustration showing the typical operation of the upcomer tube.

The process of this invention is carried out in the preferred apparatus, i. e., vertically disposed, pressure-reducing chambers, as follows: The material to be polymerized, consisting essentially of monomeric bis-2-hydroxy-ethyl terephthalate or a very low molecular weight polymer thereof (having a degree of polymerization less than 4 on the average), is introduced as a continuous stream into the lowermost section of column 1. In initiating polymerization of bis-2-hydroxy-ethyl terephthalate and very low molecular weight polymers thereof, polymerization conditions must be relatively mild as compared with the higher temperatures and lower pressures employed to complete the polymerization, i. e., attain intrinsic viscosities of 0.5 or greater. Introducing the monomeric material and very low molecular weight polymer into a vessel maintained at a temperature and pressure employed during the final polymerization stage would result in appreciable vaporization of the monomer. This would result in appreciable loss of monomer, plugging of condenser lines, and lower yields of prepolymer (in the absence of a recovery step). Accordingly, circulation of heating medium (e. g., "Dowtherm A" or p-cymene) through the jacket surrounding the lower portion of the column is adjusted and controlled to maintain a temperature therein from 5 to 25° C. lower than the temperature maintained at the top of the column. Preferably, the temperature at the bottom of the column is within the range of from 240°–265° C. The vacuum line is correspondingly adjusted and controlled at the top with the equipment designed to maintain a pressure of 25 to 100 mm. of mercury at the bottom of the column. Under the influence of heat and pressure within the limits specified, and with the assistance of a suitable catalyst, polymerization occurs with the evolution of vapors consisting mainly of vaporous ethylene glycol and small amounts of vaporized bis-2-hydroxy-ethyl terephthalate and dimethyl terephthalate. These vapors flow upwardly in a continuous stream through the upcomer tube and into the next section of the column, sweeping with them the partially polymerized liquid bis-2-hydroxy-ethyl terephthalate which, for the most part, is violently agitated and intermixed with the rising vapors as the mixture flows upward through the upcomers. This action provides for substantial surface area regeneration. Additional surface area is regenerated as the mixture of gases and liquids emerges from the top of an upcomer and splashes against the plate forming the ceiling (lower side of top plate) of the second section in the manner illustrated in Figure 5. Figure 5 serves to illustrate the violent agitation provided by flow of the mixture of gases and liquids through the upcomers, followed by a sudden exit into a chamber of greater volume, this resulting in high surface area regeneration.

With respect to polymerizing bis-2-hydroxy-ethyl terephthalate, the vapors present in the columnn consist essentially of vaporous ethylene glycol. Very small amounts of vapors of bis-2-hydroxy-ethyl terephthalate and dimethyl terephthalate are present. Generally, the amount of dimethyl terephthalate in the feed to the column should be less than about 0.2%, based upon the weight of the total feed, and no more than 0.5% should be present. The components of the column which are present in the liquid phase consist of bis-2-hydroxy-ethyl terephthalate and ethylene glycol. The total amount of ethylene glycol in the column, both in the gaseous and liquid phases, results from glycol fed into the column with the ester monomer and that which is formed as a result of the condensation reaction.

As the liquids are swept upward from section to section of the column by the relatively more rapid ascent of vapors, a pressure drop is effected from plate to plate until a final lower pressure prevails at the top of the column. Furthermore, by means of the heating jacket, the temperature at the top of the column is maintained at about 5–25° C. higher than the temperature at the bottom. The total pressure drop from the bottom to the top of the column is effected in increments as the vapor and liquid pass from plate to plate up the column. Although the total pressure drop in the column is represented by the summation of various factors, the major proportion of the total pressure drop is equal to the pressure drop attributed to the exit and entrance losses suffered by the vapor stream as the vapors pass from and into each section or stage. In other words, $$\Delta P \cong \Sigma \Delta P_{ve}$$

wherein $\Delta P$ is the total pressure drop and $\Sigma \Delta P_{ve}$ is summation of the pressure drops suffered by the vapors owing to entrance and exit into each stage (plate) of the column. In turn, the pressure drop suffered by the vapors owing to entrance and exit into a stage may be substantially represented by the sum of two factors which is substantially equal to the pressure drop due to passage through an upcomer, namely, the pressure drop due to resistance to flow through the orifice plus the pressure drop due to resistance to flow through the liquid head or plug in an upcomer. These factors will be further discussed hereinafter.

At relatively low vapor rates, the use of upcomers fabricated without an orifice at the bottom, e. g., a tube in which the vapor is permitted to pass into the bottom through the entire cross-sectional area, provides for satisfactory operation. As the vapor rate increases, however, the pressure drop per stage or plate decreases; and, consequently, the total pressure drop effected by the column for a given number of stages or plates also decreases. Furthermore, an increased vapor rate leads to the occurrence of what are called "water spouts" as the ascending vapors sweep the liquid material on a plate into the upcomers. This phenomenon is graphically illustrated in Figure 6, wherein the path of the vapors is illustrated by arrows. It is evident that as the vapor rate increases, the amount of liquid swept into the bottom of the upcomer increases to form a "water spout" which creates a surging of liquid on the plates and within the upcomers. Furthermore, the liquid level on a plate drops abnormally below the upcomer. This surging results in variable pressure drop on each of the stages or plates in addition to the fact that the pressure drop per plate or stage decreases as the rate of vapor ascent increases. Surging also results in an undesirable variable liquid product discharge even under steady feed conditions.

As mentioned hereinbefore, the bottom of each upcomer may be provided with an orifice arrangement whereby the entrance area for ascending vapors and liquids into the upcomers is restricted. In essence, the orifice arrangement is such as to block off part of the bottom of each upcomer. Several variations in orifice arrangement are illustrated in Figures 2, 3, and 4. Figure 2 illustrates the use of a disc which has a diameter equal to or slightly greater than the external diameter of the upcomer. The disc is positioned slightly below the bottom end of the upcomer, and the distance below upcomer depends on the size of the orifice desired. Figure 3 illustrates employing a disc having a diameter less than the internal diameter of the upcomer. The disc is positioned within the upcomer at the bottom, and the size of the orifice is determined by the diameter of the disc. Figure 4 illustrates a third variation in orifice design wherein the sections are cut from the sides of a closed tube or pipe at the bottom. The size of the sections and number of sections depend upon the size of the orifice desired.

In general, the provision of an orifice at the bottom of each upcomer permits maintaining an almost constant pressure drop per stage or plate as the velocity or rate of ascending vapors varies. This appears to be due to the increased influence of another factor on pressure drop when the size of the orifice, i. e., ratio of orifice area to internal cross-sectional area of the upcomer, is within a certain range as expressed in terms of ratio of orifice area to internal cross-sectional area of the upcomer.

As a consequence of restricting the size of the vapor passage by means of an orifice arrangement, the liquid level on a plate is maintained substantially constant because the "water spout" effect is eliminated; and this provides for substantially uniform distribution of liquid throughout the column for reaction, i. e., sufficient liquid on each plate for reaction. The substantially constant liquid level eliminates violent surging within the stages of the column and, hence, tends to maintain more constant pressure drop from stage to stage or plate to plate. An additional important effect of providing the upcomers with an orifice is the maintenance of a constant pressure drop at each stage or on each plate of the column as the vapor velocity increases. For example, if no liquid were moving concurrently up the column with vapors, an increase in vapor velocity leads to an increase in the pressure drop per stage or plate, owing to the restricted passage (orifice) for the ascending vapors. In general, the provision of an orifice may be considered as a resistance to the free passage of ascending vapors. In normal operation of the column, concurrent streams of vapor and liquid are ascending, the vapor sweeping the liquid upward, and any appreciable build-up of liquid through which the ascending vapors must pass is also considered a resistance to the flow of vapors. In upcomer tubes provided with an orifice and at lower vapor velocities, a head of liquid is present in the bottom of an upcomer because there is less entrainment of liquid. Although the liquid level on a plate never gets above the bottom of an upcomer, a liquid head builds up in the upcomer; and as the vapor rate is lowered, a point is reached where "bubble type" flow is taking place and the upcomer is substantially completely filled with liquid. This liquid head or plug provides an extra obstacle or resistance to the upward flow of vapor, and an additional pressure drop results.

For example, Figure 7 illustrates the condition on any particular plate during relatively high vapor velocities. In this illustration, the liquid level is even with or just below the orifice of the upcomer; and the resistance to flow is mainly due to the orifice itself. Furthermore, as the vapor velocity increases, the pressure drop owing to the orifice increases; and resistance to flow provided by a liquid head or plug decreases. On the other hand, Figure 8 illustrates the condition wherein the vapor velocity is relatively low and the liquid level in an upcomer is higher than under conditions of higher vapor velocities. In this illustration, the flow of ascending vapors is resisted not only by the orifice, but also by the liquid head or plug in the bottom of the upcomer.

Under conditions of lower vapor velocities, the pressure drop due to passage through an upcomer may be illustrated by the equation:

$$\Delta P_{en} \cong \Delta P_{vo} \text{ plus } \Delta P_{vl}$$

wherein $\Delta P_{en}$ is the pressure drop per plate or stage due to passage through an upcomer; $\Delta P_{vo}$ is the pressure drop due to the resistance to flow through the orifice; and $\Delta P_{vl}$ is the pressure drop due to the resistance to flow through the liquid head or plug in the upcomer. Under conditions of lower vapor velocities, the $\Delta P_{vo}$ decreases and the value of $\Delta P_{vl}$ becomes significant. Hence, the total pressure drop attributed to passage of vapor through an upcomer or $\Delta P_{en}$, as a result employing an orifice, remains relatively constant as the vapor velocity increases because at higher vapor velocities $\Delta P_{vo}$ increases and $\Delta P_{vl}$ becomes less significant.

In order to obtain the most efficient effect of an orifice arrangement for the purpose of maintaining a constant pressure drop, it has been found that the ratio of the orifice area to the internal cross-sectional area of the upcomer should be within the range from 0.1 to 0.15. Using an orifice which is too small, i. e., a ratio less than 0.1, restricts the flow of ascending vapors to such an extent that increasing the vapor velocity excessively increases the pressure drop. On the other hand, too large an orifice, i. e., a ratio substantially greater than 0.15, results in a decrease in the pressure drop as the vapor velocity increases, thereby approaching the effect of having no orifice.

It should be understood that operation of the present apparatus without providing an orifice for each upcomer is entirely satisfactory at relatively low vapor velocities; but at higher vapor velocities, the employment of the above described orifice arrangement is highly advantageous. Furthermore, at certain higher critical vapor velocities, the pressure drop due to the resistance of the orifice increases with any further increase in vapor velocity, without a compensating decrease in $\Delta P_{vl}$; and under such conditions, even the orifice arrangement is not sufficient for maintaining a relatively constant pressure drop per plate or stage. The critical velocity above which this occurs varies with the overall size of the column, the upcomers, and the rate of liquid feed to the column.

Related conditions, for example, temperature, pressure, rate of flow and the number of sections in the column, are so chosen that the degree of polymerization finally realized will be such as to produce, preferably in the final stage (top section of the column), a prepolymer having an intrinsic viscosity of not over 0.3.

The foregoing discussions relating to the function and advantages of restricting the area of the entrance into an upcomer, i. e., employing orifice plates, have been based upon the function of the preferred apparatus, i. e., vertically-disposed, pressure-reducing stages, for carrying out the process of this invention. On the other hand, the same considerations apply to other apparatus for practicing the present process and, particularly, to the specific alternative apparatus illustrated in Figure 9. Referring specifically to Figure 9, it has been mentioned hereinbefore that the clearance between baffles 18 and plates 21 may be adjusted to the desired opening in order to maintain the liquid level constant in each pressure-reducing chamber. Hence, the orifices in such apparatus are slot orifices; and the cross-sectional area of the orifices may be readily adjusted to the desired relationships with respect to the cross-sectional areas of the upcomer sections.

With respect to the preferred apparatus, i. e., that illustrated in Figures 1-8 inclusive, it is essential for controlling the magnitude of pressure drop effected at each section or stage that the top of an upcomer, i. e., the exit end, extend above the bottom, i. e., entrance end, of the next upcomer immediately above. This overlapping arrangement of upcomers provides for maintaining a liquid level substantially equivalent to the height of the entrance end of an upcomer above the plate immediately beneath, it being understood that the maintenance of a liquid level at or just slightly below the entrance end of an upcomer under varying vapor rates is accomplished by means of the orifice arrangements discussed hereinbefore. It should be emphasized, however, that the orifice arrangements would have no effect on maintaining the desired liquid level on each plate if the exit end of an upcomer were below the entrance end of the next upcomer immediately above. For example, if the exit end were considerably below the entrance end of the next upcomer immediately above, the liquid level on the plate would be no higher than the height of the exit end or top of the upcomer above the plate. Excess liquid would drain back through the upcomer onto the plate immediately below, and this action would cause excessive pressure drop within the upcomers. Furthermore, liquid would be lifted through each upcomer by a surging action because the liquid level would be varying; and the net result would be a surging action throughout the column along with a varying rate of liquid discharge. It is to be understood that for optimum operation, the exit end of each upcomer should be higher than the entrance end of the next upcomer immediately above; and for operation considered satisfactory, the exit end of an upcomer and the entrance end of the next upcomer immediately above may be equidistant from the top of a plate.

The following specific example further illustrates the principles and practice of this invention:

EXAMPLE

A continuous ester interchange reaction column was employed to react continuously ethylene glycol and dimethyl terephthalate. This continuous reaction column produced a continuous supply of a liquid comprising bis-2-hydroxy-ethyl terephthalate and a very low molecular weight polymer thereof having a degree of polymerization less than 4, on the average. This liquid was continuously fed into the bottom of an apparatus of the type illustrated in Figure 1. Ethylene glycol was continuously withdrawn from the top of the entrainment separator in vapor form, and liquid molten polyethylene terephthalate having an intrinsic viscosity between 0.15 and 0.3 was withdrawn from the liquid take-off just above the uppermost plate.

The following table (Table I) summarizes the typical conditions existing during runs conducted at various rates of feed.

Table I

|  | Rate of Feed of DMT to Continuous Ester Interchange Column | | | |
|---|---|---|---|---|
|  | 30 lb./hr. | 51.5 lb./hr. | 74.5 lb./hr. | 97.0 lb./hr. |
| Mol. ratio, glycol/DMT [1] | 2.8 | 2.16 | 1.99 | 1.81 |
| Total # glycol/hr | 27.4 | 35.6 | 47.5 | 56.4 |
| Rate of feed to Continuous Prepolymerization Column | ([2]) | ([2]) | ([2]) | ([2]) |
| Temp. bottom of column, °C | 261 | 252 | 252-255 | 252-255 |
| Temp. top of column, °C | 267 | 268 | 273 | 273 |
| Pressure bottom of column, mm. Hg absolute | 33 | 38 | 44 | 47 |
| Pressure top of column, mm. Hg absolute | 10 | 10 | 10 | 10 |
| Rate of prepolymer take-off | ([3]) | ([3]) | ([3]) | ([3]) |
| Rate of evolution of glycol | 7.6 | 14.6 | 21.1 | 26.8 |
| Hold-up time hours | 3 | 1.75 | 1.2 | 0.93 |
| Intrinsic viscosity of product | 0.25 | 0.23 | 0.22 | 0.20 |

[1] DMT=dimethyl terephthalate.
[2] All of monomer made in ester interchange column fed to prepolymerization column.
[3] Not measured—prepolymer resulted from above feeds of DMT to exchanger.

It is to be undersood that the pressure and temperature conditions may vary outside the ranges stated above for polymerizing bis-2-hydroxy-ethyl terephthalate; and, obviously, in the case of polymerizing other types of similar esters or other polymerizable materials, the specific operating conditions will be different. For example, the pressure at the bottom of the column may be atmospheric pressure, it being understood that a desired pressure drop may be effected by starting with any initial pressure at the bottom of the column, depending upon the particular material being processed. In the case of polymerizing bis-2-hydroxy-ethyl terephthalate, operation of the prepolymerization apparatus must be at a pressure above the vapor pressure of this monomer at the operating temperatures. For example, at 265° C., the vapor pressure of bis-2-hydroxy-ethyl terephthalate is about 1 mm. of mercury. Furthermore, operation of the continuous prepolymerization apparatus must be at pressures below the vapor pressure of ethylene glycol or the volatile constituent being removed. For example, the vapor pressure of ethylene glycol in the monomeric solution is about 760 mm. at 265° C., i.e., for the monomeric solution resulting as a product of the ester interchange reaction mentioned hereinbefore.

The operation of the continuous polymerization apparatus of the present invention inherently provides for efficient agitation and consequently high surface area regeneration. Ascending vapors sweep the liquid polymerizing mass upwards; the liquid mass is violently agitated in rising through the upcomers; and it is further agitated as it splashes and sprays within the chambers or sections of the apparatus. This action provides for efficient agitation, and the maximum surface area is exposed to the decreased pressure as the liquids ascend the column. This, in turn, provides for continuous efficient removal of ethylene glycol or other vaporous product of the condensation reaction.

In addition to the foregoing advantages, the apparatus of the present invention provides for minimum vaporization of the monomeric liquid, e. g., bis-2-hydroxy-ethyl terephthalate. A liquid comprising the monomer and/or very low molecular weight polymer is fed continuously into the apparatus under conditions of lower temperatures and higher pressures than in the final stages of polymerization. Furthermore, any monomeric material which vaporizes may be readily absorbed by liquid prepolymer in the upper portions of the column.

As a further additional advantage of the present apparatus, it is important that there be sufficient hold-up of the polymerizing mass. The present apparatus is outstanding for providing stepwise hold-up of the liquid polymerizing mass at each pressure-reducing stage.

The prepolymer produced in accordance with the present invention is usually processed further for the purpose of increasing the intrinsic viscosity to a point where the resulting polymer may be extruded into film or filament form or may be extruded into a ribbon for further cutting into particle form for molding. In the case of polyethylene terephthalate, the intrinsic viscosity is usually within the range from 0.45–1.2 for extrusion in the film and within the range from 0.3–1.2 for extrusion into filaments.

In film form, polyethylene terephthalate in unoriented form, or preferably, when stretched in one or both directions, may be used in a large variety of applications; and, owing to the outstanding strength and toughness of the film in oriented form, it can be used in calipers as low as 0.00025". On the other hand, the films are transparent and of high clarity in calipers up to 0.005"–0.010". Included among the general and many specific uses for polyethylene terephthalate film are the following: general wrapping and packaging of items such as rice, dried beans, sugar, coffee, fresh produce, soap powders, cigars, cigarettes, pipe tobacco, cement, automobile tires, textiles, greased and untreated machine parts, hardware, gift wrapping, etc.; packaging of articles to be sterilized, such as medicaments, instruments, chemicals, ointments, gauze, bandages, and the like; packaging of foodstuff which may be heated in the package and stored, such as various red meats, squash, cranberries, hamburgers, frankfurters, popcorn, etc.; glass replacement for storm, greenhouse and chicken house windows; polarizing film for automobile headlights and windshields; safety-glass interlayer, e. g., as an interlayer for laminating glass-to-glass or for laminating glass-to-polymethyl methacrylate; windows for containers and envelopes; transparent cans; container and bottle cap liners; laminations with metal foil to give metallic effects in fabrics; laminations with wood, paper or fabrics for pictures, book covers, wall protectors for around light switches, etc.; wallpaper in clear, pigmented or printed form; millinery applications, for example, in braid form either alone or laminated to another film of a different color; one-way stretched film for tear tapes for packages, e. g., cigarette packages; pressure sensitive tapes and adhesive tapes, particularly, one-way stretched film or one-way stretched film which is cross-laminated; transparent measuring tapes; various electrical applications such as slot insulation for motors, small coils in the form of metal laminations for telephone and radio equipment, primary insulation for heat resistant wire, electrical insulation tape, split mica insulating tape, e. g., mica sheets laminated between film, small condensers, e. g., metal foil laminated to film, weather resistant electrical wire, e. g., a conductor wrapped with film and coated with asphalt, wrapping for submerged pipe to insulate against ground currents, laminations with paper to improve dielectric strength of the paper, etc.; sound recording discs, tapes and magnetic tapes, particularly those types fabricated from one-way stretched film or cross-laminated one-way stretched films; plastic binder for strengthening non-woven fabrics; parting sheets for low pressure laminating; fabric replacement for garment bags, shoulder covers, etc.; tubing for replacing metal tubing in various applications; protective devices such as face shields, goggles, etc.; base film for metallizing by vacuum deposition, sputtering or other techniques; photographic film base for black and white or color photography; ropes or belts fabricated by twisting and/or braiding ribbons or filaments; bacteriostatic applications for inhibiting mold growth, mildew or bacteria growth; barrier against diffusion of gases, e. g., as a barrier against diffusion of dichlorodifluoromethane from refrigerator systems; for air filters based on electrostatic action, e. g., composites of shredded films or ribbons as a filter medium in circulating air heating and cooling systems; protective surfacing film for thermal insulation, e. g., as a protective wrapping for rock wool batts; outside wrapping or inside liner for piping of all types, particularly plastic piping; as a base sheet for deep drawing or forming operations, e. g., forming sheets into the shape of containers, dishes, plates for food stuff, hardware, etc.; cross-lamination of one-way stretched sheets employing a pigmented or colored adhesive, the laminations being employed in window shades, awnings, tarpaulins, etc.; and various specific applications such as playing cards, greeting cards, milk bottle hoods, drinking straws, tying ribbon, tracing cloth, display and picnic dishes, disposable protectors against war gases, showcase covers, ground floors for tents, tent windows, printed charts, nomographs and scales, umbrellas, raincoats, file folders, refrigerator bags, tobacco pouches, snare and base drum heads, tops for convertible automobiles, covers for automobiles in shipment and storage, display card holders, ticker tape, heat shrinkable bands, protective covering for flash bulbs, applied in the form of a heat shrinkable film, bottle caps, window shades, etc.

As many widely different embodiments may be made without departing from the spirit and scope of this invention, it is to be understood that said invention is in no wise restricted save as set forth in the appended claims.

I claim:

1. In a process for the production of low molecular weight polymers from polymerizable liquid compositions which polymerize with the evolution of vaporous by-products, the improvement which comprises continuously passing the polymerizable liquid composition successively through a series of pressure-reducing reaction zones, each maintained at a temperature effective to promote polymerization with the evolution of vaporous by-products, and causing the polymerizable liquid composition to become admixed with the vaporous by-product in passing from reaction zone to reaction zone, whereby agitation of said liquid composition is effected.

2. In a process for the production of low molecular weight polymers wherein polymerization of a polymerizable liquid composition is accompanied by the evolution of vaporous by-products, the improvements which comprise continuously passing the polymerizable liquid composition into a first reaction zone maintained at a predetermined temperature and pressure effective to promote partial polymerization of said composition with the evolution of vapor by-products, continuously conducting a mixture of said partially polymerized composition and said vapors upwardly through a restricted passageway into a second reaction zone whereby a pressure drop between said first and second reaction zones is effected, maintaining said second zone at a predetermined temperature effective to promote further partial polymerization of said partially polymerized composition, and continuously passing an admixture of the resulting partially polymerized composition and vapors through restricted passageways to successive reaction zones with resultant successive pressure drops until a low molecular weight polymer having an intrinsic viscosity no greater than about 0.3 is obtained.

3. A process for forming a prepolymer from a polymerizable liquid composition from the group consisting of bis-2-hydroxy-ethyl terephthalate and low molecular weight polymers thereof having a degree of polymerization of less than 4, on the average, which comprises continuously passing said liquid composition into a first reaction zone maintained at a temperature within the range of 240–265° C., whereby to effect partial polymerization of said composition with the evolution of ethylene glycol vapor, continuously conducting a mixture of said partially vapor, continuously conducting a mixture of said partially polymerized composition and said vapors through a restricted passageway into a second reaction zone whereby a pressure drop between said first and second reaction zones is effected, further partially polymerizing said partially polymerized composition and continuously passing an admixture of the resulting partially polymerized composition and vapors through restricted passageways to successive reaction zones with resultant successive pressured rops until a prepolymer having an intrinsic viscosity no greater than about 0.3 is formed, the temperature in the last of said reaction zones being maintained at a temperature of from 5 to 25° C. above the temperature of said first reaction zone.

4. The process of claim 3 wherein a pressure within the range of from 25 to 100 mm. of mercury is maintained in said first reaction zone.

5. Apparatus for continuous polymerization of liquid polymerizable compositions comprising in combination a plurality of superimposed reaction chambers each defined by top, bottom and side walls; in each chamber, a first tube extending through the bottom of the chamber and through the top of the chamber immediately therebelow and terminating in a top orifice substantially above the bottom of the chamber and a bottom orifice substantially below the top of the said chamber therebelow, said tube providing the sole inlet for the chamber and the sole outlet for the said chamber therebelow, a second tube offset with respect to said first tube and extending through the top of the chamber and the bottom of the chamber immediately thereabove, the lower end of said second tube terminating in an orifice a short distance below the top opening of said first tube, said second tube providing the sole outlet for the chamber and the sole inlet for the said chamber thereabove, means for maintaining said reaction chambers at predetermined temperatures, and means communicating with the uppermost reaction chamber operative to effect continuous liquid and gas separation.

6. Apparatus according to claim 5 wherein each tube at its upper end is open for substantially the entire cross-sectional area thereof, and the area of the orifice at the bottom of each tube is less than the cross-sectional area of the tube.

7. Apparatus according to claim 6 wherein the ratio of the orifice area at the bottom of the tube to the cross-sectional area of the tube is within the range of from 0.1 to 0.15.

8. Apparatus for continuous polymerization of liquid polymerizable compositions comprising in combination a vertical tower, a plurality of spaced horizontally disposed plates dividing said tower into a plurality of superimposed reaction chambers, a vertical tube disposed in each plate providing the sole means of communication between the chamber above and below said plate, said tube terminating in an upper orifice substantially above the plate and a lower orifice substantially below the plate, the lower orifice being below the level of the upper orifice of the tube in the plate next below; means for maintaining said tower at predetermined temperature levels, liquid inlet means at the bottom of said tower, and means communicating with the uppermost chamber in said tower operative to effect continuous liquid and gas separation.

9. Apparatus according to claim 8 wherein each vertical tube at its upper end is open for substantially the entire cross-sectional area thereof, and the ratio of the area of the orifice at the bottom of said tube to the cross-sectional area of the tube is within the range of from 0.1 to 0.15.

References Cited in the file of this patent

UNITED STATES PATENTS

| | | |
|---|---|---|
| 1,438,123 | McElroy | Dec. 5, 1922 |
| 1,806,089 | Seguy | May 19, 1931 |
| 1,808,088 | Urquhart | June 2, 1931 |
| 2,371,477 | Souders et al. | Mar. 13, 1945 |
| 2,610,908 | Deprez et al. | Sept. 16, 1952 |

OTHER REFERENCES

Ser. No. 309,376, Friederich et al. (A. P. C.), published Apr. 20, 1943.